United States Patent [19]

Zimmerman et al.

[11] Patent Number: 4,837,377
[45] Date of Patent: Jun. 6, 1989

[54] RUBBERY, ELECTRICALLY NON-CONDUCTIVE, AND INTRINSICALLY MAGNETIC GRAPHITE INTERCALATION COMPOUNDS AND METHODS FOR THEIR MAKING

[75] Inventors: George O. Zimmerman, South Hamilton; Abdo K. Ibrahim, Dorchester, both of Mass.

[73] Assignee: Trustees of Boston University, Boston, Mass.

[21] Appl. No.: 137,910

[22] Filed: Dec. 28, 1987

[51] Int. Cl.$^4$ ............................................... C01B 31/04
[52] U.S. Cl. ................................... 423/448; 423/445; 423/460; 252/62.56; 502/181
[58] Field of Search ...................... 423/445, 448, 460; 502/181; 252/502, 506, 509, 62.56

[56] References Cited

U.S. PATENT DOCUMENTS

| | | | |
|---|---|---|---|
| 3,409,563 | 11/1968 | Olstowski | 423/448 |
| 3,842,113 | 10/1974 | Ichikawa et al. | 502/181 |
| 3,984,352 | 10/1976 | Rodewald | 502/181 |
| 4,604,276 | 8/1986 | Oblas et al. | 252/506 |
| 4,632,775 | 12/1986 | Kalnin et al. | 252/502 |
| 4,729,884 | 3/1988 | Sugiura et al. | 423/460 |

FOREIGN PATENT DOCUMENTS 61-72609 4/1986 Japan .................... 423/448

OTHER PUBLICATIONS

Kwizera et al.; The Microstructure of Intercalated Graphite Fibers, Journal of Carbon, vol. 25, No. 5, (1982), pp. 387–394.
Anderson et al., Exfoliation of Intercalated Graphite, Journal of Carbon, vol. 22, No. 3, (1984), pp. 253–263.
Dresselhaus et al., "Intercalation Compounds of Graphite", Advances in Physics, 1981, vol. 30, No. 2, pp. 140 to 152, and 266 to 276.

Primary Examiner—John Doll
Assistant Examiner—Robert M. Kunemund
Attorney, Agent, or Firm—David Prashker

[57] ABSTRACT

A unique class of intinsically magnetic graphite intercalation compounds and methods for their making is provided. These compositions are ferromagnetic, electrical insulators, and rubber-like in consistency. The compositions are useful in a variety of different applications in view of their intrinsic magnetism, electrical resistance, and rubber-like qualities.

13 Claims, 4 Drawing Sheets

RUBBERY, ELECTRICALLY NON-CONDUCTIVE, AND INTRINSICALLY MAGNETIC GRAPHITE INTERCALATION COMPOUNDS AND METHODS FOR THEIR MAKING

RESEARCH SUPPORT

The research investigations for the present invention were supported by Government Contract No. AFOSR-82-0286 awarded by the Air Force.

FIELD OF THE INVENTION

The present invention is concerned with the physical and chemical propeties of graphite intercalation compounds and is directed to the preparation of intrinsically magnetic and electrically non-conductive rubbers from graphite intercalation compounds.

BACKGROUND OF THE INVENTION

The present invention involves specifically altered graphite intercalation compounds (hereinafter GIC's), their properties and their preparation. For this reason it is imperative that a clear understanding be had of the chemical composition, atomic structure and organization, and physical properties of GIC's generally. The reader is presumed to have familiarity and a working knowledge of this art which can be supplemented and expanded with specific publications. Both a general description of the art and many specific details regarding graphite intercalation compounds are provided by the following publications, the texts of which are expressly incorporated by reference herein: *Graphite Intercalation Compounds* (P. C. Eklund, M. S. Dresselhaus, and G. Dresselhaus, editors), Materials Research Society, Pittsburgh, 1984; and *Graphite Intercalation Compounds* (M. S. Dresselhaus, G. Dresselhaus, and S. A. Solin, editors), Materials Research Society, Pittsburgh, 1986; *Physics And Chemistry of Materials with Layered Structures* (F. Levy, editor), Ridel, Dordrecht, 1979; *Mossbauer Spectroscopy* (Greenwood and Gibb, editors), Chapman and Hall, Limited, London, 1971.

Graphite intercalation compounds were discovered in 1841 when Schafhautl observed a dramatic swelling of crystalline graphite when submerged in a mixture of sulfuric and nitric acids. It was not until 1932, however, that the first modern research investigations for the intercalation of graphite by ferric chloride were undertaken by Thiele. Since that time, a variety of investigations using alkali metals and halogens have been carried out. Of these, GIC's utilizing ferric chloride (the ferric chloride system) have the distinct advantage of providing a high degree of stability under atmospheric conditions and thus have become the best known and best documented intercalant material.

In recent years, there has been a great interest and much investigation of graphite intercalation compounds due to the discovery that intercalate systems provide high electrical conductivity. In GIC's, electrical conductivity is one of the properties most drastically increased by intercalation of both acceptor and donor materials [A.R. Ubbelohde, *Proc. R. Soc. London, Ser. A.* 327:289 (1972); Vogel et al., *Mater. Sci. Eng.* 31:261 (1977)]. The increase of electrical conductivity presently holds the greatest promise for technological applications of GIC's because such compounds offer the electrical conductive properties of metals combined with the abundance of carbon and the manufacturing capability for the production of carbon fibers [M. S. Dresselhaus and G. Dresselhaus, *Adv. Phys.* 30:139 (1981)]. Accordingly, many investigations involve the measurement of the electrical resistivity in GIC's using the low-frequency eddy-current technique [Vogel et al., *Solid State Science* 38:288 (1981)]. Concurrently, other investigations have focused on the magnetic effects and other physical properties of graphite and GIC's. Ferric chloride has been the primary intercalant of interest in these graphite intercalation compounds, a system known hereinafter as "$FeCl_3$—GIC."[A. K. Ibrahim and G. O. Zimmerman, *Phys. Rev. B* 34:4224 (1986); Y. S. Karimov and A. V. Zvarykina, *Sov. Phys. Solid State* 13:2388 (1972); Hohlwein et al., *Phys. Status Solidi B* 64:305 (1974); Millman et al., *Solid State Communications* 43:903 (1982)].

Since many of the properties of GIC's are directly attributable to the structure and organization of the intercalation composition, it is useful to briefly summarize the atomic structure, internal organization, and physical properties of GIC's generally, using the $FeCl_3$-GIC system as the preferred illustrative example. Each and every GIC is an ordered, repetitious sequence of two materials: graphite; and an intercalant material such as ferric chloride. Graphite exhibits a high degree of anisotropy in many of its physical properties. This anisotropy is most noticeable in its cleavage properties. The in-plane atomic structure of graphite consist of a hexagonal arrangement of carbon atoms with a distance of 1.42 Å between the nearest adjacent carbon atoms. This in-place structure is typically described in mathematical terms by lattice vectors $\vec{a}$ and $\vec{b}$ (representing directions in the x and y planes). The lattice vector $\vec{a}$ and $\vec{b}$ each have a length of 2.45 Å and are typically separated by an angle of 60° between adjacent graphite cells. The lattice vector $\vec{c}$ (representing the z axis of a three dimensional structure) typically has a length of 3.35 Å. The three dimensional structure of graphite thus is definable by the lattice vectors $\vec{a}$, $\vec{b}$, and $\vec{c}$ and constitutes the atomic structural layer or single organizational stage. When multiple layers of graphite are formed, there is a specific alignment between the individual layers wherein the atoms of the second layer project onto the atoms of the first layer. In this internal organization, the second layer is displaced from the first along the $\vec{a}$ and $\vec{b}$ vectors. Accordingly, in terms of a three dimensional unit description, a stratum of multiple graphite layers can be described by the alignment of the lattice vectors $\vec{a}$, $\vec{b}$, and $\vec{c}$ respectively. However, with GIC's, it is not only the atomic structure and internal organization which is important, but also the number of individual graphite layers forming a single stratum which becomes a decisive parameter. For definitional purposes, the term "stage index" refers to the number of individual graphite layers definable by the lattice vectors a, b, and c which combine to form a single stratum between two consecutive intercalant layers.

Ferric chloride ($FeCl_3$) is a salt with ionically bonded iron and chlorine atoms. In the solid state, $FeCl_3$ forms a layered hexagonal lattice structure which melts at 282° C. and boils at 319° C. In its pristine form, $FeCl_3$ is an electrical insulator. However, ferric chloride is unstable in the atmosphere due to its hygroscopic nature and will draw moisture out of the atmosphere to form a variety of hydrates. Crystals of $FeCl_3$ are hexagonal and define a unit cell structure in a single plane utilizing six molecules of $FeCl_3$. The iron ions in one plane form a layer of hexagons with the chlorine ions in the planar layers above and below. A single stage of molecular structural layer is defined by the lattice vectors $\vec{a}'$, and $\vec{b}'$, each of which have a length of 6.06 Å and are separated by 60°. The lattice vector $\vec{c}'$ defining the length of the unit cell is 17.36 Å; and consecutive molecular structural layers of ferric chloride are separated by a distance of $\frac{1}{3}$ the $\vec{c}'$ vector.

Structurally and organizationally, graphite intercalation compounds can be considered as a disturbance of the graphite planar structure. The crystal structure of the carbon atoms remains virtually unchanged as the graphite is intercalated; the differences are primarily in the number of individual atomic layers forming the graphite stratum between two consecutive intercalant strata. Consecutive graphite strata thus form a sandwich-like internal organization between which the intercalate is positioned. In a case of ferrich chloride, this intercalate stratum contains the same structure as a single layer of pristine ferric chloride. Thus as it appears along the $\vec{c}$ vector direction, the GIC formed is an ordered, reptitious sequence of a number (n) of graphite layers followed in sequence by a ferric chloride layer, in which "n" is defined as the stage index. The stage index is deemed to be the most important characterization of an intercalation compound. It is mainly the stage index that determines the relative concentration of the intercalate species and also the repeat distance ("$I_c$") which can be determined directly using X-ray diffraction techniques [S. Blairs and R. A. J. Shelton, *J. Inorg. Nucl. Chem.* 28:1855 (1966); Wertheim et al., Solid State Communications 33:809 (1980)].

The preparation f FeCl$_3$—GIC samples in a variety of different stages is conventionally known using a two zone furnace technique where the stage index is controlled by the temperature difference between the graphite employed and the ferric chloride. [M. S. Dresselhauss and G. Dresselhaus, *Adv. Phys.* 30:139 (1981)]. Because ferric chloride is itself a magnetic material, a variety of magnetic susceptibility measurements and investigations upon FeCl$_3$- graphite intercalated compounds have been performed [Karimov et al., *Sov. Phys. - Solid State* 13:2388 (1972); Hohlwein, *Phys. Status Solidi B* 64:305 (1974); Stampfel et al., *Phys. Rev. B* 8:4371 (1973); Millman et al., *Phys. Rev. B* 25:6595 (1982); Millman et al., *Solid State Communications* 43:903 (1982); Corson et al., *Solid State Communications* 42:667 (1982); and Millman and Zimmerman, *J. Phys. C* 16:L89 (1983)]. These experiments and techniques illustrate the variety of efforts to measure the properties and characteristics of electrically conductive GIC's in an overall purpose and desire to decrease the electrical resistance properties of such compositions.

SUMMARY OF THE INVENTION

The present invention provides an electrically non-conductive, rubbery, and intrinsically magnetic graphite intercalation compound and methods for its preparation. The intrinsically magnetic graphite intercalation compound comprises an ordered, repetitious sequence of a multi-staged graphite stratum followed by an intercalant stratum, each graphite stratum being composed of a plurality of atomic structural layers of graphite at a ratio of not less than 4:1 with respect to the number of molecular structural layers forming said intercalant stratum, each said intercalant molecular structural layer comprising at least one ferromagnetic metal composition.

The method for making an electrically non-conductive, rubbery, an intrinsically magnetic graphite intercalation compound comprises the steps of obtaining a graphite intercalation compound comprising an ordered, repetitious sequence of a multi-staged graphite stratum followed by an intercalant stratum, each said graphite stratum being composed of a plurality of atomic structural layers of graphite at a ratio of not less than 4:1 with respect to the number of molecular structural layers forming said intercalant stratum, each said intercalant stratum being composed of a halide salt having the formula $MX_{(n)}$ wherein M is a ferromagnetic metal, X is a halide moiety selected from the group consisting of fluorine, chlorine, bromine and iodine, and n is not less than 2;

reacting the graphite intercalation compound at an elevated temperature in the range of about 150°–350° C. with an alkali metal in an inert environment for a predetermined time period; and combining the reacted graphite intercalation compound with at least one composition selected from the group consisting of molecular oxygen and water vapor.

BRIEF DESCRIPTION OF THE DRAWING

The present invention may be more fully and easily understood when taken in conjunction with the accompanying drawing, in which.

DETAILED DESCRIPTION OF THE PREFERRED EMBODIMENTS

Figure 1:
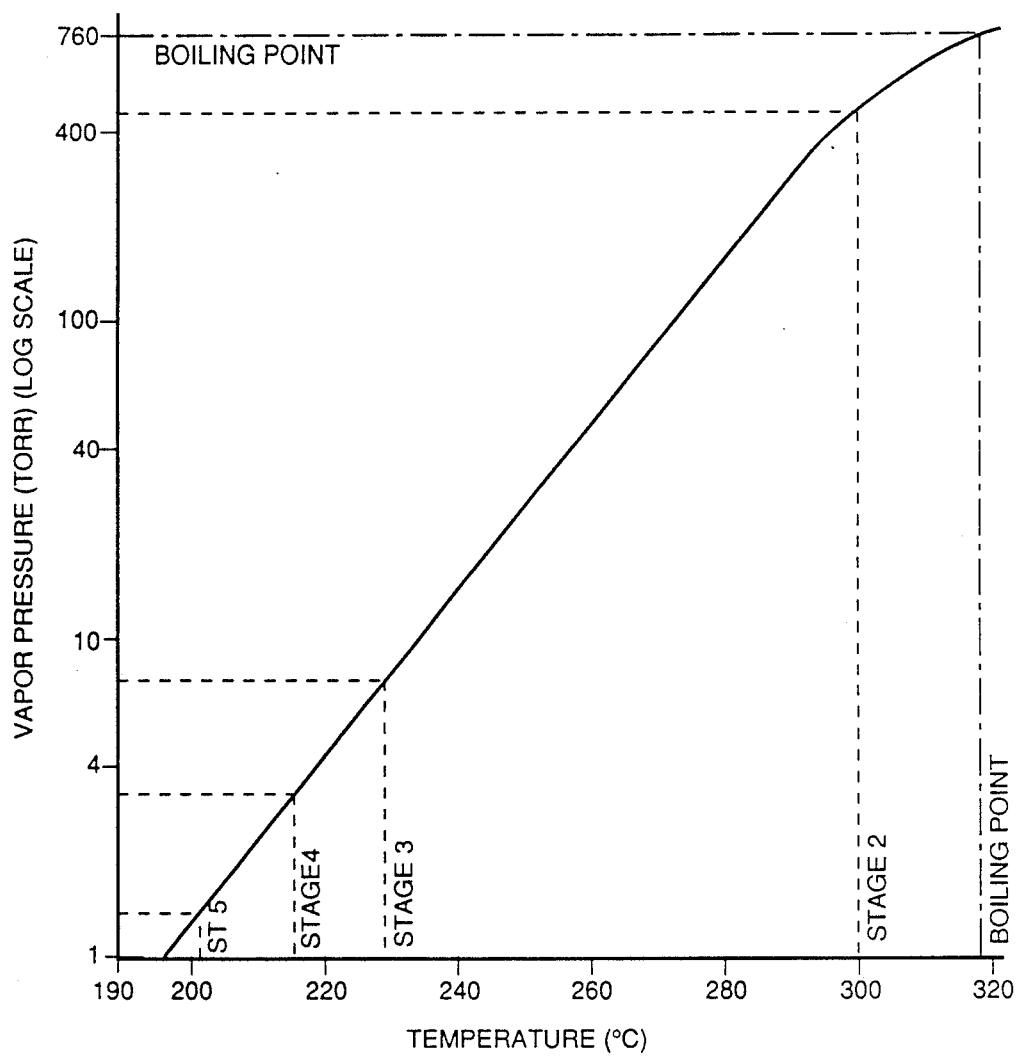
FIG. 1 is a graph illustrating ferric chloride vapor pressure as a function of increasing temperature.

The present invention is a class of unique graphite intercalation compounds of defined chemical composition and requisite organizational structure and includes methods for their preparation. The novel GIC's have several unique physical properties which may be advantageously employed in a variety of different applications. First, unlike intercalation compounds known in the art which are effective electrical conductors, the novel GIC's are electrical insulators which provide a high degree of resistance to electric current. Second, the intercalation compounds of the prior art are generally known to be brittle, non-elastic materials; in comparison, the GIC's are flexible, highly elastic rubbers. Third, while intercalation compounds conventionally known often employ a magnetic materials such as ferri chloride as the intercalant, the resulting intercalation compounds are not intrinsically magnetic at room temperature; in comparison, the GIC's of the present invention are ferromagnetic at room temperature and can be prepared to provide a substantial magnetic moment per unit mass in comparison to the magnetic moment of soft iron.

The previously unknown and unavailable properties of GIC's prepared in accordance with the present invention can be employed in both sophisticated and relatively common applications. For example, computer software employs magnetic discs for both programming and memory storage capacity. Currently available commercial products are made via a mixture of a magnetic powder (such as iron or some other magnetic alloy) and a rubbery substance which is then molded into the conventional disc configuration. The magnetic properties of such discs are directly controlled by the quantity of magnetic material incorporated into the admixture. In comparison, GIC's prepared using the novel methodology described hereinafter yield a substance which is intrinsically magnetic at the atomic level; and inherently provides plasticity and elasticity typically provided by non-magnetic rubbers. Less sophisticated applications include the use of the unique GIC's as closure materials in the form of O-rings, seals, and strips attached to doors and flaps of many common appliances in the home. In certain other applications, the non-conductive electrical properties are desirable, particularly in circumstances where elasticity of material as well as good electrical insulation is required. Clearly, therefore, the GIC's of the present invention may be usefully employed in a variety of different industries, products, and specific applications.

The intrinsically magnetic graphite intercalation compounds provided by the present invention require that a specific chemical formulation and unique internal organization be present. The requirement is that an ordered repetitious sequence of materials exist, this sequence being a multi-staged graphite stratum followed by an intrinsically magnetic intercalant stratum composed of at least one ferromagnetic metal composition. The graphite stratum is multi-staged in every instance and comprises a plurality of atomic structural layers of graphite present at a ratio of not less than 4:1 with respect to the number of molecular structural layers of intercalant forming each intercalant stratum. Each graphite stratum, therefore, will contain at least 4 atomic structural layers of graphite; in comparison the intercalant stratum will be a single molecular structural layer of a ferromagnetic metal composition in most instances.

The GIC's prepared in accordance with the present invention take advantage of and rely upon a mechanism of action which has not been appreciated heretofore. During intercalation of graphite, it is only the graphite layers immediately adjacent to the intercalant material which change significantly. Clearly, as the prior art has well demonstrated, the mere use of a magnetic material as the intercalant does not result in the production of an intrinsically magnetic GIC. Instead, as will be empirically demonstrated hereinafter, it is the stage index (n) of the graphite stratum with respect to a single layer of intercalant which is the decisive factor and which directly influences and effects the magnetic interactions between successive magnetic intercalant layers. By systematically increasing the stage index of the graphite stratum separating two successive intercalant molecular structural layers (or strata), each individual intercalant layer (or stratum) becomes ever-more shielded from the next in sequence until their interaction within the GIC as a whole becomes insignificant. The cumulative effect of shielding successive intercalant layers (or strata) from one another creates a unique two-dimensional magnetic system within the GIC substantially different from the conventionally known three-dimensional magnetic systems with their concomitant interfering interactions. By creating and maintaining a novel two-dimensional magnetic system, the inherent magnetic properties of the intercalant material forming each intercalant stratum become paramount and the GIC as a whole demonstrates intrinsic magnetism.

As is demonstrated hereinafter, GIC's in which the graphite stratum has a relatively low stage index of 1–3 (the number of atomic structural layers of graphite between two successive intercalant layers), provide insufficient shielding of the individual intercalant strata from each other with the result that intercalant interaction continues to be substantial. Alternatively, when the graphite stratum in the GIC has a relatively high stage index of not less than four atomic structural layers of graphite per atomic structural layer of intercalant material, each graphite stratum in the GIC is able to effectively shield each individual intercalant stratum in succession, thereby reducing their interactions to insignificance and creating a two-dimensional magnetic system for the intercalant in the GIC. Under these circumstances, if the material comprising the intercalant is composed of a ferromagnetic metal composition, the GIC as a whole becomes intrinsically magnetic; and provides other desirable physical properties such as being electrically non-conductive and being elastic. It will be recognized and appreciated, therefore, that while the minimum stage index for the graphite stratum is believed to be four, the specific stage index may be increased as desired and GIC's having a graphite stage index of 9, 10, and greater per single atomic structural layer of intercalant are expected to be useful in varying degrees.

Methods for making the electrically resistant and intrinsically magnetic GIC's of the present invention follow conventionally known techniques. These methods will yield graphite intercalation compounds which comprise an ordered, repetitious sequence of a multi-staged graphite stratum followed by an intercalant stratum of known composition, each graphite stratum comprising a plurality of graphite atomic structural layers at a ratio of not less than 4:1 with respect to the number of intercalant molecular structural layers forming each intercalant stratum. For illustrative purposes only, the methodology described hereinafter is directed to an intercalant stratum having only a single atomic structural layer, the most common format of the invention. Nevertheless, it is clearly understood that the methodology is also suitable for the making of other GIC's with a plurality of molecular structural layers in each intercalant stratum [P. LaGrange, *J. Mat. Res.* 2:827 (1987)].

Accordingly, an initial graphite intercalation compound is prepared in accordance with conventional procedures documented in the literature and is comprised of a graphite stratum containing not less than four atomic structural layers or stages of graphite followed sequentially by an intercalant stratum having a molecular structural layer composed of a halide salt having the general formula $MX_{(n)}$ wherein M is a ferromagnetic metal preferably selected from the group consisting of iron, cobalt, nickel, and certain rare-earth elements such as gadolinium and dysprosium;

X is a halide moiety selected from the group consisting of fluorine, chlorine, bromine, and iodine; and n is a number not less than 2.

This initial intercalation compound is then combined with an alkali metal in an inert environment in a sealed glass tube which is then placed into a two zone furnace at an elevated temperature for a predetermined time. Suitable alkali metals for use include potassium, sodium and lithium. Typical intercalation compound: alkali metal ratios (by weight) are preferably in the range from about 10:1 through 1:10 respectively. The exact quantitative proportions will vary with the halide salt used as the intercalant and the identity of the alkali metal itself. The temperature in the furnace should be sufficiently great to permit a softening of the material and preferably is at a temperature able to melt or boil the alkali metal. The design of the furnace or glass tube should provide a temperature gradient of about 50° C. per 5 cm between the location of the initial intercalated compound and the positioning of the alkali metal. In this manner, a portion of the alkali metal becomes vaporized and a vapor pressure is maintained which diffuses through the length of the glass tube for reaction with the initial graphite intercalation compound. To avoid contaminating influences, it is desirable that an inert atmosphere be maintained within the glass tube, typically one provided by a closed environment of molecular nitrogen or helium gas. The time for reaction between the initial graphite intercalation compound and vaporized alkali metal will vary with the vapor pressure within the glass tube. At relatively high ratios of alkali metal, a relatively high vapor pressure ($10^{-2}$–$5 \times 10^{-2}$ torr) will be created at the elevated temperature and the reaction will be complete in approximatly 24 hours. Alternatively, at lower reaction temperatures, a relatively lower vapor pressure ($\sim 10^{-3}$ torr) is created and a reaction time of up to seven days duration may be required. Clearly, however, any reasonable reaction time period may be had by choosing a proper combination of intercalation compound: alkali metal ratio, reaction temperature, temperature gradient, and vapor pressure. It is apparent therefore, that the true reaction time for any given intercalation material may vary substantially as needed or desired by the user or specific circumstances.

During the reaction of the initial graphite intercalation compound with the vaporized alkali metal at the elevated temperature, evidence of the reaction progress can be physically observed by the slow exfoliation of the material; and typically, by an observable change in material color during the reaction. The exfoliation effect, typically provides an inflated, puffy material having an increased volume and reduced density. The color changed observed is from black to metallic brown. It is believed that the exfoliation of the reacted material provides the rubbery elasticity and electrical resistance to the composition subsequently produced.

The final step combines the exfoliated, alkali metal-reacted intercalation compound with preferably a mixture of molecular oxygen and water vapor. This is most easily achieved by exposing the alkali metal-reacted compound to ambient air which typically provides both oxygen and water vapor in adequate amounts. The result of air exposure will be characterized by a change in visible color, from metallic brown to black, for the reaction product and the presence of a demonstratable magnetic moment per unit mass - intrinsic ferromagnetism. The degree of magnetization for the reaction product, the electrical insulation capacity, and the degree of rubbery elasticity will vary in substantial degree with the specific materials employed and the individual reaction conditions.

To insure a comprehensive and complete understanding of the present invention, the preparation of an intrinsically magnetic ferric and ferric oxide - graphite intercalation compound will be described in detail. The methodology is described in specific detail using research laboratory scale components which can be expanded to meet industrial manufacturing operations and similar large-scale facilities at will. It will be clearly understood, however, that the preparation of ferric and ferric oxide-graphite intercalation compounds is merely representative of the large variety of other GIC's which can be prepared using this process. Under no circumstances is the invention to be limited or restricted to the compositions, concentrations, chemical formulae, and/or specific reactions described hereinafter.

I. Graphite Preparation

The preferred material for the production of GIC's is highly oriented pyrolytic graphite (hereinafter "HOPG"). Many other types of graphite are available and any one of them may be used for intercalation purposes. The choice of HOPG is mainly due to the ease of procuring large quantities with the desired dimensions in the lattice vector $\vec{c}$ direction. It is perpendicular to this $\vec{c}$-direction that the graphite may be easily cleaved; thus care must be taken when handling these graphite materials.

Initially, the graphite is cut into conveniently sized crystals using a string saw. The graphite is mounted on a plate with wax to hold it securely and to insure that the crystals are not damaged by the vibrations transmitted by the circulating string saw. Individual samples are cut perpendicularly to the layer planes to a size of 7 millimeters by 7 millimeters. The mounting plate is then heated to melt the wax and the individual graphite samples are washed in acetone to remove residual wax. The graphite blocks are then cut along the plane perpendicular to the $\vec{c}$-axis with a razor blade (or similar sharp edge) because this is the direction of cleavage for the crystalline graphite and will produce typical $\vec{c}$-axis sizes of 1–2 millimeters. The surface of the graphite crystals are removed by pealing layers of graphite with scotch tape. This pealing procedure was continued until a single, smooth surface appears on the crystal.

It is desirable to intercalate very thin slices of graphite because the probability of producing more homogeneous intercalated products is much greater. Typically, the initial thickness of an HOPG crystal was less than 0.5 mm. Thinner samples are produced by cutting the graphite with a string saw as previously described. Once a polished surface is achieved, additional layers are then removed with scotch tape. The adhering layers are then removed from their scotch tape backing by washing them in a solution of two parts acetone and one part carbon tetrachloride. After soaking in this solution for about 10 minutes, excess scotch tape residual is brushed off with a cotton swab and the remaining graphite is rinsed in methanol. The thickness of these thin slices is in the range of 10–50 microns. Best results for preparing GIC's of the present invention is achieved using such thin slices of graphite.

II. Preparation of Ferric Chloride

Due to the hygroscopic nature of ferric chloride and the high degree of chemical purity needed for intercalation, it is necessary to synthesize the ferric chloride to be used directly in the intercalation vessel. The ferric chloride used for intercalation is produced chemically by preferably reacting iron with chlorine gas. The chlorine used is in the form of a bottle cylinder of gas of 99.9% purity (Matheson Gas). The iron is in the form of wires approximately 7.0 centimeters in length and 0.3 millimeters in diameter (Mallincrodt Chemical Works). The purity was listed at 99.54%.

The wire is preferably coiled in order to expose a high surface area and to reduce the overall volume. However, before the wire can be used, it is necessary to clean the exterior surface in order to guarantee a high degree of purity for the reaction. Accordingly, the wire is first washed in acetone to remove any dirt or grease from the surface. It is then placed in a 1:5 solution of sulfuric acid and water for about 15 seconds. The acid solution strips off any surface oxides that may have been formed and exposes a fresh, highly reactive surface on the wire. After the acid treatment, the iron wire is rinsed in water and thena gain in methanol. The wire is then dried using a hot air blower and immediately placed in a sealed container containing silica gel (or other dessicant) to insure a low humidity atmosphere until the time of use. Due to the high reactivity of the wire surface, the wire is handled and stored carefully until reaction.

Two methods are commonly used to produce ferric chloride: the first [G. M. Calabrese, Bachelor's Thesis, Massachusetts Institute of Technology, 1979] involves a sealed system which can be evacuated and then filled with chlorine gas to react with the iron wire. The second is an open system in which the chlorine gas flows through an ampoule over the iron wire during the reaction. Either or both of these methods may be used according to individual desires and circumstances. In both instances, the ferric chloride is produced according to the reaction $$2 Fe + 3 Cl_2 \rightarrow 2 FeCl_3.$$

III. The Intercalation Process

Initially, the thin slices of prepared graphite and the freshly prepared ferric chloride are placed at opposite ends of a sealed ampoule. The intercalation process involves bringing the graphite and the ferric chloride to an elevated temperature such that the ferric chloride vaporizes and diffuses into the graphite host. While many parameters affecting the intercalation process are still not completely known, the critical parameters of control are the elevated temperatures and reaction times used for the process. The vapor pressure of the ferric chloride is a direct function of the elevated temperature. This function is graphically illustrated by FIG. 1 and reveals the large variation of vapor pressure for ferric chloride within the temperature range between 190°–300° C.

Figure 2:
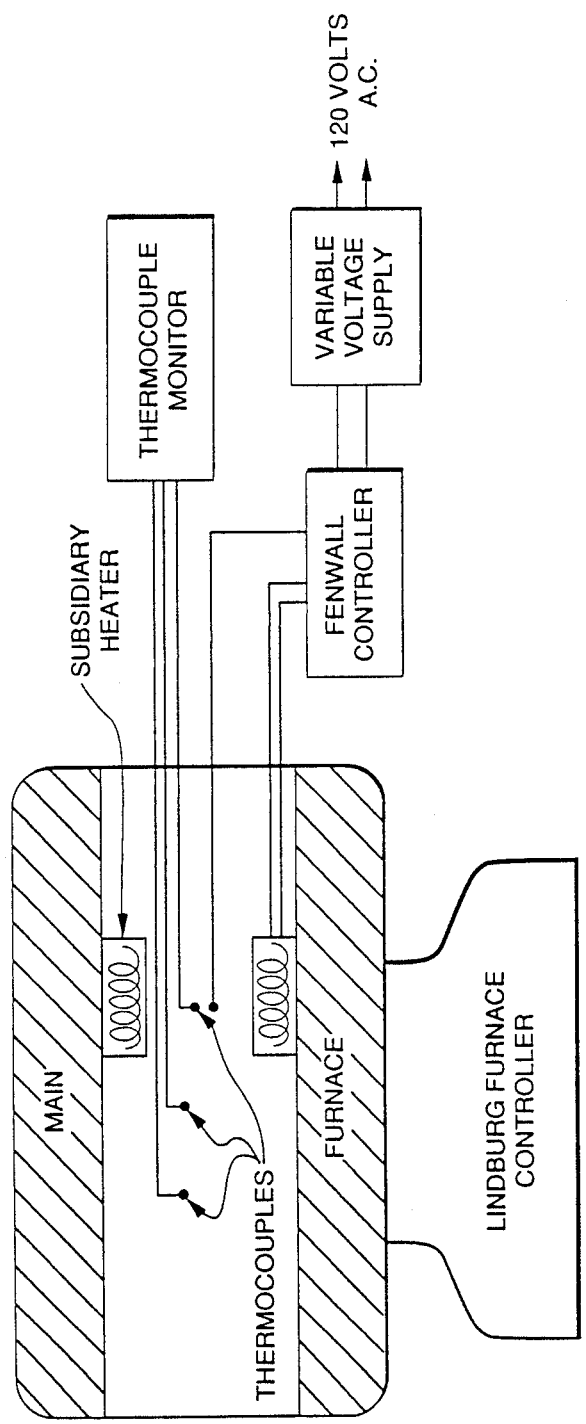
FIG. 2 is a schematic block illustration of a furnace useful for the preparation of graphite intercalation compounds.

The intercalation process is that conventionally known in the art. The intercalation process proceeds using a two-zone furnace such as that illustrated by FIG. 2 which includes a main furnace and controller as well as a subsidiary heater made from a power resistor connected to a variable voltage source. The subsidiary heater can be dispensed with if a two zone furnace with separate temperature controls is available. The preferred resistor has a capacity of dissipating 100 watts of power and has a resistance of 100 ohms. The temperature is monitored using thermocouple devices. Chromel-alumel thermocouples are preferably to be used because of their high sensitivity in the desired temperature range. In order to maintain control of the temperature in the subsidiary heater, a Fenwal temperature controller is used in series with the supply voltage.

The ampoule is positioned in the furnace with the graphite temperature controlled by the subsidiary heater and the ferric chloride temperature controlled by the main furnace. The graphite rectangular blocks (1.5×0.5×0.1 cm³) are heated first followed by switching on of the main furnace. It was found that this procedure gives the best results and avoids uneven heating of the graphite and irregular diffusion of the ferric chloride molecules into the graphite blocks. A convenient temperature for the graphite was found to be 350° C.

A number of different stages for the graphite stratum may be prepared by varying the temperature of the ferric chloride. In all test samples, the quantity of ferric chloride in the ampoule was in excess; the exact amount is not crucial and the 7 cm length of iron wire provides an amount sufficient for the intercalation process. The desired stage index of the formed GIC's is achieved through rigid temperature control of the reaction; by controlling the pressure of chlorine gas and the partial pressure of the ferric chloride in the ampoule; and by rigid regulation of the lower temperature. The temperature controls for each of the various stage indices are provided by Table I and by the data provided by the graph of FIG. 1 respectively [G. M. Calabrese, Bachelor's Thesis, Massachusetts Institute of Technology, 1979].

TABLE 1

| TEMPERATURE FeCl₃ (°C.) | GRAPHITE STAGE INDEX |
| --- | --- |
| 300 | 2 |
| 227 | 3 |
| 216 | 4 |
| 202 | 5 |
| 192 | 11 |
| 180 | Graphite, no intercalation |

After intercalation, the FeCl₃-GIC's are characterized for identity and uniformity of staging by use of x-ray (001) diffraction in the conventionally known manner. Only wellstaged (homogeneous) samples were used for subsequent reactions.

IV. Conversion of FeCl₃-GIC Into An Intrinsically Magnetic Rubbery Compound

To demonstrate the effect of the stage index and to illustrate the shielding effect by GIC's having a stage index of 4 or greater, two different FeCl₃-GIC's were converted into novel intercalation compounds. These were: a FeCl₃-GIC with a graphite stage index of 2; and an FeCl₃-GIC having a graphite stage index of 5. Each of these was identically processed in the following manner.

A sealable glass tube, preferably between 15–30 centimeters in length, is utilized for the conversion process. Into this sealed glass tube, the FeCl₃-GIC is positioned at one end. At the other end a small quantity of an alkali metal, preferably potassium, is positioned. Typically, the GIC sample weighed about 0.1 grams for which a minimum of 0.01 grams of potassium would be utilized. The ratios of GIC and alkali metal may be varied according to the ratios given previously herein. In many instances, it is desirable that the weight of the alkali metal and the GIC would be substantially equal as this would insure that sufficient potassium would diffuse through the sealed tube during the conversion process. There also should be some measurable distance between the potassium and the GIC within the tube interior. Under these test conditions, the distance was at least 10 centimeters and preferably not greater than 30 centimeters. This distance range allows for a useful temperature gradient to occur over the length of the sealed tube without having the potassium precipitate out on the exterior surface of the graphite.

Prior to heating, the interior of the glass tube is filled with an inert gas such as nitrogen or helium to maintain an inert environment. The glass tube is then sealed and placed in a furnace, preferably for 24 hours at a temperature of 300° C. Within the sealed tube, there is an approximately 50° C. temperature gradient difference between the GIC and the potassium. In the alternative, it is known that potassium will melt at a temperature as low as 65° C. and therefore the GIC can be held at an internal temperature of between 150–350° C. One should take measures to insure that the GIC is always at a higher temperature than the potassium in order to avoid the potassium vapor condensing out on the graphite surface.

It will be appreciated that when using a furnace temperature of 300° C., 24 hours are required for the reaction to proceed to completion. Under these higher temperature conditions, a high vapor pressure of about 0.28 torr for the potassium was maintained and the reaction proceeded in a relatively short, 24 hour period of time. If the furnace temperature is reduced, the vapor pressure of the potassium will be similarly diminished, and the overall reaction time must therefore be increased for conversion to occur. At the lower temperature range, a reaction duration of seven days exposure is expected.

During the diffusion of vaporized potassium into the $FeCl_3$-GIC, the stage 5 GIC will be observed to acquire a brown metallic color and the stage 5 GIC sample will visibly exfoliate. There is no change in color and no exfoliation observed for the stage 2 GIC under identical conditions. Subsequently, after this initial reaction period, the glass tube is exposed to water vapor and molecular oxygen. This is most expeditiously achieved by opening the tube in ambient air which provides both the requisite compositions. Once the tube is opened in air, the previously metallic brown stage 5 GIC blocks turn black in color again and become rubbery, intrinsically magnetic and electrically insulative. The stage 5 composition is sufficiently magnetic to be picked up by an ordinary table magnet. In comparison, there is no visible change in stage 2 GIC's and no demonstrable magnetism.

The chemical reactions believed to occur during the conversion process described herein comprise a single primary reaction and not less than 3 secondary reactions. These are:

(Primary Reaction): 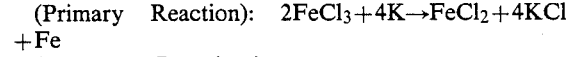 $2FeCl_3 + 4K \rightarrow FeCl_2 + 4KCl + Fe$ (Secondary Reactions):
a. $2FeCl_2 + 3H_2O \rightarrow FeCl_2 \cdot 2H_2O + FeCl_2\, H_2O$
b. $Fe + 2H_2O \rightarrow FeOOH + H_2$
c. $4Fe + 3O_2 \rightarrow 2Fe_2O_3$ In view of these chemical reactions occurring during the conversion process, the intrinsic magnetic properties of the GIC are clearly due to a newly produced intercalant comprising at least one ferromagnetic metal composition. Clearly, in this specific instance where the ferric chloride intercalant was reacted with potassium, two different ferric oxides were formed, FeOOH and $Fe_2O_3$. The ferromagnetism exhibited by these ferric oxides is clearly demonstrated in the literature and is empirically demonstratable on demand. Nevertheless, however, as will be demonstrated below, it is not sufficient merely to produce one or more oxygen containing ferromagnetic metal compositions in order to obtain a GIC which is intrinsically magnetic. Rather, it is the shielding effect of the high stage index graphite stratum in combination with intercalant ferromagnetic compositions which causes the GIC to become intrinsically magnetic as a whole.

V. Differences Between Stage 2 and Stage 5 Intercalation Compounds.

One of the unique features of the present invention is evidenced by a comparison of the properties between stage 2 and stage 5 GIC's prepared in accordance with the described methodology. The determinations and empirical evaluations recorded are based on a direct comparison of converted stage 2 and converted stage 5 GIC's which were identically prepared and chemically alike in all respects except for the stage index of their respective graphite stratum. It will be appreciated that the stage 2 GIC is representative of that class which has a relatively low stage index of 1, 2, or 3 respectively. Similarly, the stage 5 GIC will be recognized as representing the higher stage intercalation compositions having a stage index of 4 or greater. The parameters measured for both these GIC's were elasticity; electrical conductivity or resistance; and degree of magnetization, respectively.

1. Rubber-Like Properties

The stage 2 GIC under normal handling conditions was found to be brittle, inflexible, and fragile. Individual rectangular blocks prepared as $1.5 \times 0.5 \times 0.1$ cm$^3$ rectangular plates were easily broken into fragments and could not be bent in any useful degree. In comparison, the stage 5 GIC rectangular plates of similar dimensions took on a cylindrical shape after exfoliation; were plastic and easily bent; demonstrated elasticity; and could endure both compression and tension forces of small degree without fragmentation. The stage 2 GIC is clearly similar to those intercalation compounds previously known and available in the prior art in its tensile properties. The stage 5 GIC is uniquely different and provides rubber-like properties consistent with generally plastic materials of other origins.

2. Electrical Properties

The stage 2 and stage 5 GIC prepared in accordance with the present invention were evaluated for electrical conductivity in the following manner: the probes of a multimeter capable of measuring resistance were attached to the stage 2 and stage 5 GIC's individually. The range of sensititivity of the multimeter was from 0.01 ohms to $20 \times 10^6$ ohms. The resistance measured across the stage 2 GIC with the probes 5 mm apart was less than could be read by the meter. The stage 5 GIC exhibited a reading greater than $20 \times 10^6$ ohms. The clear conclusion therefore is that stage 2 GIC's are electrical conductors whereas stage 5 GIC's are electrical insulators.

3. Intrinsic Magnetism

Initially, the magnetic susceptibility of the stage 2 and stage 5 GIC's were measured at temperatures between 1° K and 300° K. The magnetic susceptibility evaluation was performed in accordance with a standard method using a Hartshorn bridge and astatic coils [Ibrahim and Zimmerman, *Phys. Rev.* B34:4224 (1986); Ibrahim and Zimmerman, *Phys. Rev.* B35:1860 (1987)]. The evidence clearly demonstrates that the stage 2 GIC as a whole is paramagnetic whereas the stage 5 GIC as a whole is ferromagnetic.

The magnetism of each staged compound was also measured by means of the force balance, Guoy method [Guoy, L.G., Compt. Rend. 104:935 (1889)]. Each converted stage 2 and stage 5 GIC was compared to the magnetic moment of soft iron. The data is presented by Table 2 below.

TABLE 2

| Stage 2 GIC | Stage 5 GIC |
| --- | --- |
| Resistance: less 0.01 ohms | greater than 20 × 10⁶ ohms |
| Magnetic moment 5/1000 per mass compared to an equivalent mass of iron: | 2/100 |

This evaluation of magnetic moment demonstrates that the stage 5 GIC showed a magnetic moment per unit mass which was 2% of that for iron; in comparison, the stage 2 GIC showed a magnetic moment per unit mass which was only 0.5% of that for iron. It is expected that the magnetic moment will be increased substantially above the 2% level under optimum conversion process conditions.

Figure 3:
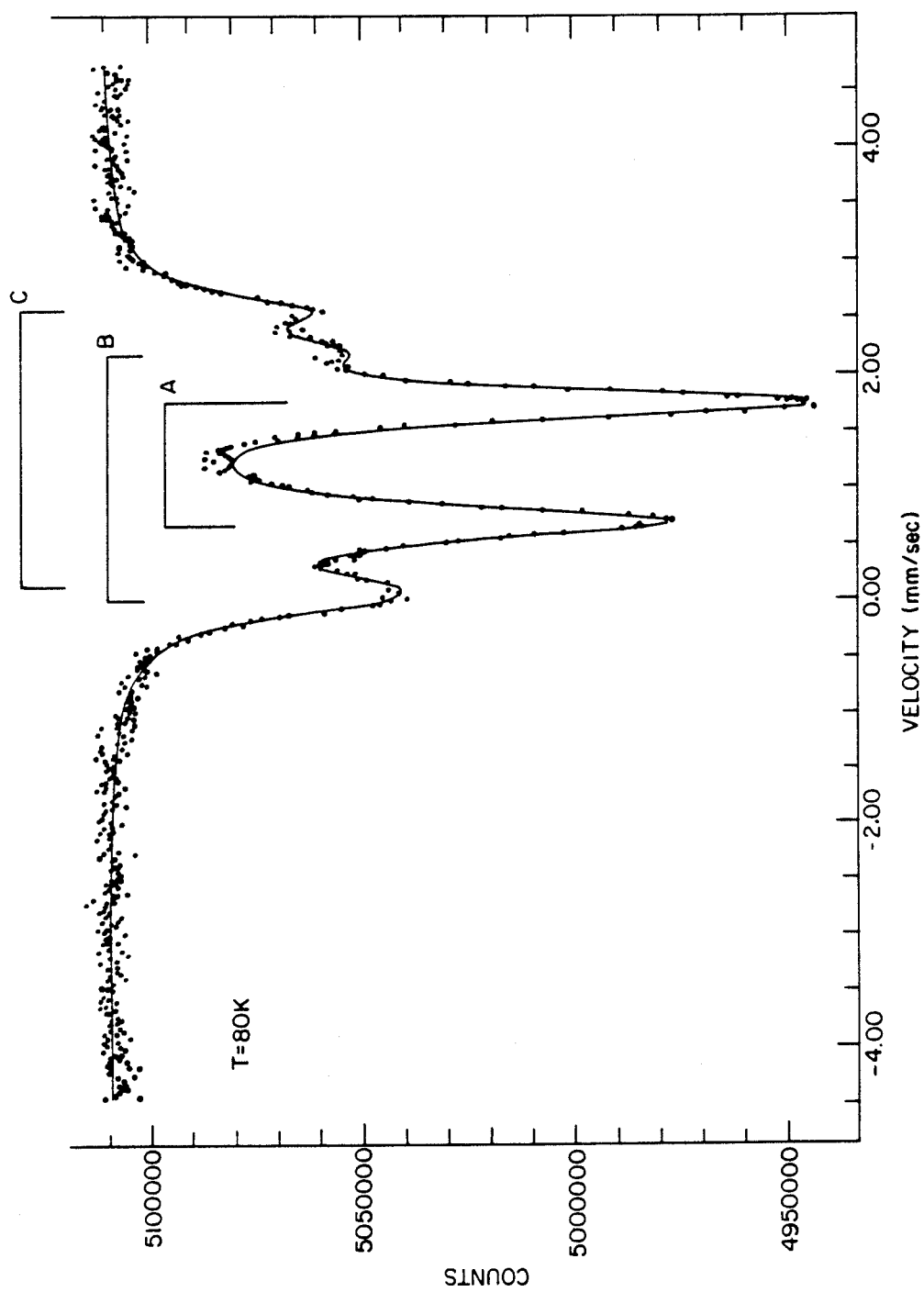
FIG. 3 is a graph illustrating Mössbauer spectra of stage 2 graphite intercalation compounds prepared in accordance with the present invention, T=80K.
Figure 4:
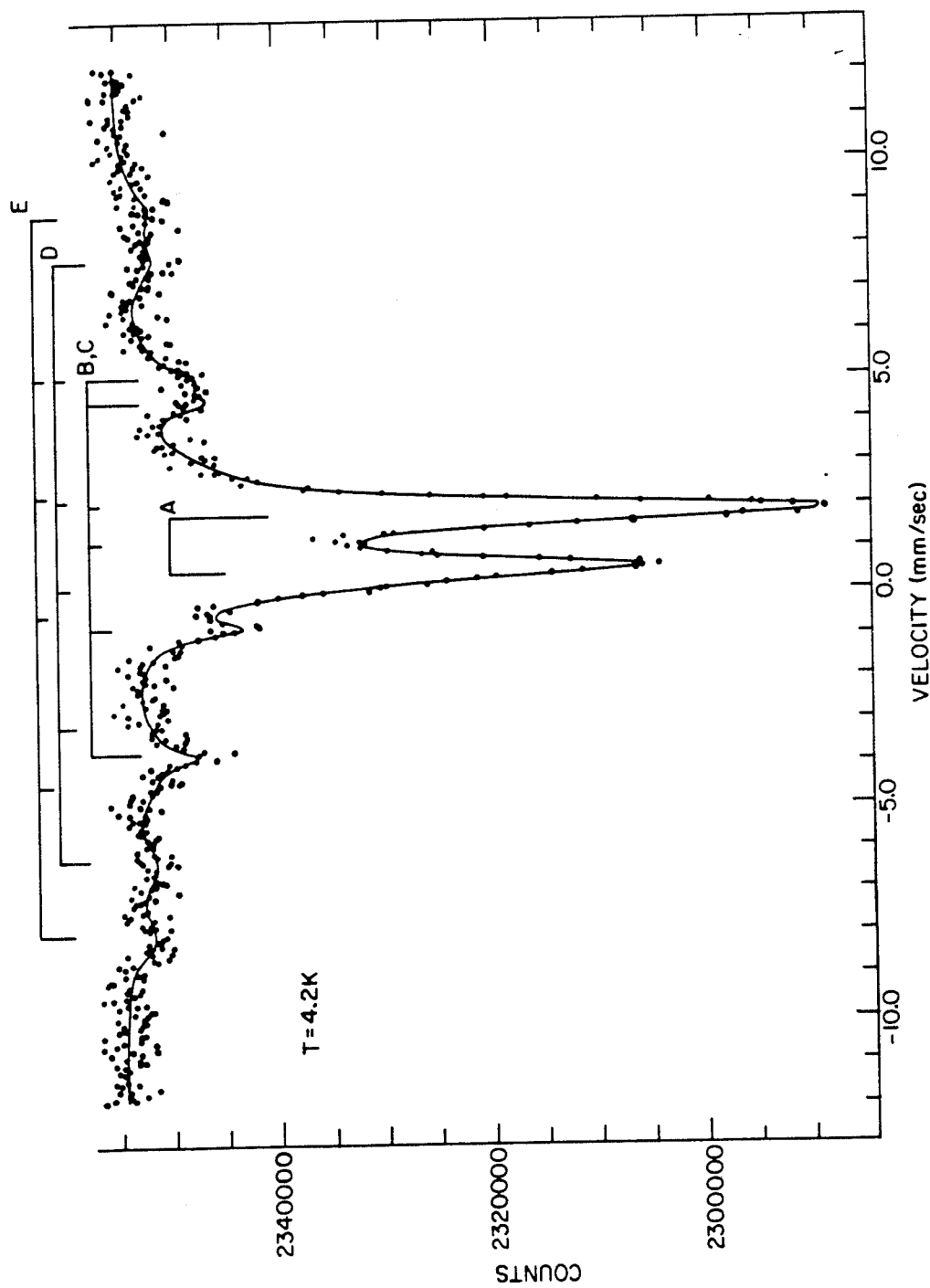
FIG. 4 is a graph illustrating Mössbauer spectra of stage 2 graphite intercalation compounds prepared in accordance with the present invention, T=4.2K.

Finally, both the converted stage 2 and 5 GIC was evaluated by Mössbauer analysis in accordance with the conventional assay techniques [Millman et al., *Phys. Rev. B* 25:6595 (1982); Corson et al., *Solid State Communications* 42:667 (1982)]. It will be recalled that the Mossbauer effect can reveal the magnetic environment of an atomic nucleus and thus identify various compounds and valancies of iron. Mössbauer spectra were obtained at T=250, 180, 80 and 4.2K. Representative spectra for both stage 2 and stage 5 are shown by FIGS. 3 and 4, and Moössbauer parameters are tabulated by Table 3 below.

TABLE 3

| T (K) | δ (mm/sec) | DE$_Q$ (mm/sec) | Γ (mm/sec) | H$_{in}$ (kOe) | Site |
| --- | --- | --- | --- | --- | --- |
| 250 | 1.12 ± 0.03 | 0.85 ± 0.05 | 0.28 ± 0.03 | | A |
|  | 1.01 | 1.75 | 0.32 | | B |
|  | 1.20 | 2.43 | 0.28 | | C |
| 80 | 1.21 ± 0.03 | 1.04 ± 0.05 | 0.34 ± 0.03 | | A |
|  | 1.09 | 2.24 | 0.36 | | B |
|  | 1.35 | 2.45 | 0.34 | | C |
| 42 | 1.70 ± 0.03 | 1.30 ± 0.05 | 0.66 ± 0.03 | | A |
|  | 1.46 | 2.24 | 0.46 | 257 ± 5 | B + C |
|  | 0.46 | — | 1.20 | 528 ± 10 | D |
|  | 0.50 | — | 1.20 | 438 ± 10 | E |

As these empirical data demonstrate, at liquid nitrogen temperature and above, three quadrupole doublets are resolved, corresponding to three distinct iron sites in the sample. All sites are consistent with high spin ferrous iron and show temperature dependent quadrupole splittings. At 4.2 K, magnetic hyperfine structure appears superimposed on a central asymmetric doublet. The temperature dependence of the Mössbauer parameters and the presence of absence of a magnetic phase transition at low temperatures identifies these sites as follows:

Site A: Anhydrous $FeCl_2$. The observed asymmetry in the quadrupole doublet is deemed to be the result of preferential orientation in the sample due to the two dimensional nature of intercalation;

Site B: $FeCl_2 \cdot H_2O$ or possibly $FeCl_4$. In view of this site becoming magnetic at 4.2 K, the identification of $FeCl_2 \cdot H_2O$ is highly favored.

Site C: $FeCl_2 \cdot 2H_2O$. This substance is known to undergo a magnetic phase transition at $T_c = 23K$ and gives a characteristic magnetic hyperfine signature in the Mossbauer spectra at low temperature.

In addition, at 4.2 K as seen in FIG. 4, two additional magnetic subsites are observed to contribute very broad and diffuse magnetic signatures. These are identified as sites d and E respectively. These sites correspond to a distribution of internal magnetic hyperfine fields centered about 440 and 530 kOe respectively. Such large magnetic hyperfine fields can arise only from high spin ferric iron with oxygen ligands. Accordingly, Site D is identified as FeOOH and Site E is identified as $Fe_2O_3$. The distribution of internal fields are consistent with relaxation phenomena of small magnetic particles or a spin glass structure.

The identification of the presence of FeOOH and $Fe_2O_3$ in the stage 2 GIC indicates that the magnetic moment in stage 5 GIC is due to the iron oxides which in bulk form are ferrites. The Moössbauer spectra data clearly support and confirm both the Primary Reaction and Secondary Reactions previously identified for the conversion process for GIC's.

The present invention is not to be restricted in form nor limited in scope except by the claims appended hereto.

What we claim is:

1. An intrinsically magnetic grphite intercalation compound comprising:
   an ordered, repetitious sequence of a multi-staged graphite stratum followed by an intercalant stratum, each said multi-staged graphite stratum being composed of not less than four atomic structural layers of graphite, each said intercalant stratum being comprised of a single molecular structural layer of at least one ferromagnetic metal oxide composition.

2. An intrinsically magnetic graphite intercalation compound comprising:
   an ordered, repetitious sequence of a multi-stage graphite stratum followed by an intercalant stratum, each said multi-staged graphite stratum being composed of a plurality of graphite atomic structural layers at a ratio of not less than 4:1 with respect to the number of intercalant molecular layers forming each intercalant stratum, each said intercalant stratum being comprised of at least one ferromagnetic metal oxide composition.

3. The compound as recited in claim 1 or 2 wherein said ferromagnetic metal of said intercalant stratum is selected from the group consisting of iron, cobalt, nickel, gadolinium and dysprosium.

4. The compound as recited in claim 1 or 2 wherein said multi-staged grapahite stratum is composed of from 5-10 atomic structural layers of graphite.

5. A method for making an intrinsically magnetic graphite intercalation compound comprising the steps of:
   obtaining a graphite intercalation compound comprised of an ordered, repetitious sequence of a multi-staged graphite stratum followed by an intercalant stratum, each said multi-staged graphite stratum being composed of not less than four atomic structural layers of graphite, and each said intercalant stratum being composed of a single molecular structural layer of a halide salt having the formula
   $MX_n$ wherein
   M is a ferromagnetic metal,
   X is a halide moiety, and
   n is a number not less than 2;
reacting said graphite intercalation compound at an elevated temperature with an alkali metal; and combining said reacted graphite intercalation compound with at least one substance selected from the group consisting of molecular oxygen and water such that at least one ferromagnetic metal oxide composition is formed within said intercalant stratum.

6. A method for making an intrinsically magnetic graphite intercalation compound comprising the steps of:

obtaining a graphite intercalation compound comprised of an ordered, repetitious sequence of a multi-staged graphite stratum followed by an intercalant stratum, each said multi-staged graphite stratum being composed of a plurality of graphite atomic structural layers at a ratio of not less than 4:1 with respect to the number of intercalant molecular structural layers forming each intercalant stratum, each said intercalant stratum being composed of a halide salt having the formula $MX_n$ wherein M is a ferromagnetic metal,
X is a halide moiety, and
n is a number not less than 2;

reacting said graphite intercalation compound at an elevated temperature with an alkali metal; and combining said reacted graphite intercalation compound with at least one substance selected from the group consisting of molecular oxygen and water such that at least one ferromagnetic metal oxide composition is formed within said intercalant stratum.

7. The method as recited in claim 5 or 6 wherein said ferromagnetic metal is selected from the group consisting of iron, cobalt, and nickel.

8. The method as recited in claim 5 or 6 wherein said ferromagnetic metal is selected from the group consisting of gadolinium, dysprosium, and other rare-earth elements.

9. The method as recited in claim 5 or 6 wherein said halide moiety is selected from the group consisting of fluorine, chlorine, bromine, and iodine.

10. The method as recited in claim 5 or 6 wherein said alkali metal is selected from the group consisting of potassium, sodium, and lithium.

11. The method as recited in claim 5 or 6 wherein said graphite intercalation compound is reacted at an elevated temperature in the range from about 150–350° C.

12. The method as recited in claim 5 or 6 wherein said graphite intercalation compound is reacted in an inert environment.

13. The method as recited in claim 5 or 6 wherein said graphite intercalation compound is reacted for a time ranging from about 24 hours - 7 days duration.

* * * * *